United States Patent
Zhao et al.

(10) Patent No.: US 8,669,301 B2
(45) Date of Patent: Mar. 11, 2014

(54) RADIATION CURABLE ADHESIVE

(75) Inventors: Ming Zhao, East Longmeadow, MA (US); Leo Ternorutsky, East Longmeadow, MA (US); Patrice Mariucci, Monson, MA (US); Victor Xynia Lu, Marietta, GA (US)

(73) Assignee: Allnex Belgium S.A., Brussels (BE)

( * ) Notice: Subject to any disclaimer, the term of this patent is extended or adjusted under 35 U.S.C. 154(b) by 128 days.

(21) Appl. No.: 13/119,525

(22) PCT Filed: Sep. 22, 2009

(86) PCT No.: PCT/EP2009/062235
§ 371 (c)(1),
(2), (4) Date: Apr. 6, 2011

(87) PCT Pub. No.: WO2010/034699
PCT Pub. Date: Apr. 1, 2010

(65) Prior Publication Data
US 2011/0184125 A1    Jul. 28, 2011

Related U.S. Application Data

(60) Provisional application No. 61/136,647, filed on Sep. 23, 2008.

(51) Int. Cl.
C08G 18/48 (2006.01)
C08G 18/56 (2006.01)
C08G 18/72 (2006.01)
C08G 18/75 (2006.01)

(52) U.S. Cl.
USPC .......... 522/174; 525/123; 525/131; 428/41.5; 428/423.1; 156/275.5

(58) Field of Classification Search
USPC .................. 525/131, 123; 522/174; 428/41.5, 428/423.1; 156/275.5
See application file for complete search history.

(56) References Cited

U.S. PATENT DOCUMENTS

2008/0194725 A1* 8/2008 Schwalm et al. ............... 522/90
2008/0194775 A1   8/2008 Blum et al.

FOREIGN PATENT DOCUMENTS

| DE | 10 2005 015 309 | 10/2006 |
| EP | 1 958 974 | 8/2008 |
| JP | 11-5809 | 1/1999 |
| JP | 2007-137937 | 6/2007 |
| WO | 01/30879 | 5/2001 |
| WO | WO 2006103228 A1 * | 10/2006 |
| WO | 2006/117156 | 11/2006 |
| WO | WO 2006117156 A1 * | 11/2006 |
| WO | 2007/025577 | 3/2007 |

OTHER PUBLICATIONS

International Search Report issued Dec. 11, 2009 in International (PCT) Application No. PCT/EP2009/062235.

* cited by examiner

*Primary Examiner* — Randy Gulakowski
*Assistant Examiner* — Christopher M Rodd
(74) *Attorney, Agent, or Firm* — Wenderoth, Lind & Ponack, L.L.P.

(57) ABSTRACT

The present invention relates to urethane(meth)acrylate resins obtained from the reaction, in a first step, of at least one polyisocyanate (I) with at least one compound (II) containing at least two reactive groups capable to react with isocyanate groups and at least one (meth)acrylate (III) containing essentially one reactive group capable to react with isocyanate groups, and, in a subsequent step, reacting the product obtained from the first step with at least one polyisocyanate (IV) different from the poly-isocyanate (I) used in the first step, and their use for making radiation cured pressure sensitive adhesives.

13 Claims, No Drawings

RADIATION CURABLE ADHESIVE

This application is a U.S. national stage of International Application No. PCT/EP2009/062235 filed Sep 22, 2009, which claims the benefit of U.S. provisional application Ser. No. 61/136,647 filed Sep. 23, 2008.

The present invention relates radiation curable urethane resins and their use for making adhesives, in particular pressure sensitive adhesives.

Radiation curable adhesives have several advantages over conventional solvent, water and/or hot melt adhesives. They can be cured immediately, resulting in high output, reduced work in progress, reduced energy consumption, reduced floor space and low or no emissions of undesirable components such as volatile organic compounds (VOC). Radiation curable polyurethanes are known to exhibit useful properties as a component of radiation curable adhesive copolymers. Various radiation curable polyurethane compositions and their use as pressure sensitive adhesives (PSA) have already been proposed.

JP 20022309185 discloses a radiation curable PSA based on a polyurethane which is synthesized by first making a hydrogenated polybutadiene polyol react with a polyisocyanate compound and secondly making an isocyanate group terminated compound obtained in the preceding step react with hydroxyl group-containing (meth)acrylate. The length of the backbone is short, and the number of repeating urethane bond is limited in 2-5.

JP 2002322454 describes radiation curable removable pressure sensitive adhesives that contain a special urethane (meth)acrylate based on polyols such as silicone polyols, 1,4 polybutadiene diols, hydrogenated 1,4 polybutadined diols, methylene glycols and/or fluoro/perfluoroallylene polyols.

U.S. Pat. Nos. 5,747,551 and 5,883,148 disclose UV-curable PSAs comprising (a) photoinitiator; (b) polyurethane with pendant acrylates; (c) acrylate monomers; (d) acrylated polybutadiene with Mn of 4,000-6,000 and (e) tackifying agent.

WO 05-068529 describes UV curable PSAs of urethane (meth)acrylate polymers with a urethane extended backbone formed by reacting diisocyanates with a mixture of polyols derived from acrylates and polyols derived from rubber polymers.

WO 06-117156 describes UV curable PSA of urethane (meth)acrylate polymers formed by reacting diisocyanates with polyols derived from rubber polymers.

WO 07-025577 describes a UV curable PSA made by a solventless single stage polymerization of: 10% to 80% by weight of at least one polyol which has molecular weight ≥1000 daltons; from 0.5% to 20% of at least one poly-isocyanate(s); from 0.1% to 10% by weight of at least one hydroxyl (meth)acrylate(s); and from 10% to 80% by weight of one or more tackifier resins.

However, despite these advantages radiation curable adhesives have yet to achieve widespread commercial success. It has proven difficult to provide adhesives that contain functional groups that can be cured by radiation whilst also maintaining the required balance of other properties (such as cohesion, adhesion etc) needed for good adhesive performance. Moreover, it is desirable that radiation cured adhesives are not so prohibitively expensive that this would negate the value they provide to the end user.

The present invention addresses the aforementioned problems with prior art adhesives.

Therefore the present invention relates to a urethane(meth)acrylate resin obtained from the reaction, in a first step, of at least one polyisocyanate (I) with at least one compound (II) containing at least two reactive groups capable to react with isocyanate groups and at least one (meth)acrylate (III) containing essentially one reactive group capable to react with isocyanate groups, and, in a subsequent step, reacting the product obtained from the first step with at least one polyisocyanate (IV) different from the polyisocyanate (I) used in the first step.

In the present invention, the term "(meth)acryl' is to be understood as to encompass both acryl and methacryl compounds or derivatives as well as mixtures thereof.

By polyisocyanate (I) and (IV) are meant to designate organic compounds comprising at least two isocyanate groups. The polyisocyanate compound preferably comprises not more than three isocyanate groups. The polyisocyanate compound is most preferably a diisocyanate.

The polyisocyanate compound is generally selected from aliphatic, cycloaliphatic, aromatic and/or heterocyclic polyisocyanates or combinations thereof.

Examples of aliphatic and cycloaliphatic polyisocyanates are 1,6-diisocyanatohexane (HDI), 1,1'-methylene bis[4-isocyanatocyclohexane] (H12MDI), 5-isocyanato-1-isocyanatomethyl-1,3,3-trimethylcyclohexane (isophorone diisocyanate, IPDI) and hydrogenated tetramethylxylilene diisocyanate. Aliphatic polyisocyanates containing more than two isocyanate groups are for example the derivatives of above mentioned diisocyanates like 1,6-diisocyanatohexane biuret (HDI-biuret) and trimer.

Examples of aromatic polyisocyanates are 1,4-diisocyanatobenzene (BDI), 2,4-diisocyanatotoluene (TDI), 1,1'-methylenebis[4-isocyanatobenzene] (4,4'-diphenylmethane diisocyanate, MDI), 2,4'-diphenylmethane diisocyanate, xylilene diisocyanate (XDI), tetramethylxylilene diisocyanate (TMXDI), 1,5-naphtalene diisocyanate (NDI), tolidine diisocyanate (TODI), p-phenylene diisocyanate (PPDI) and 4-bromo-metaphenylene diisocyanate.

Polyisocyanate (I) is preferably selected from aliphatic and cycloaliphatic polyisocyanates, such as HDI, H12MDI, HDI-biuret and IPDI, and benzylic based diisocyanates, such as TMXDI. Polyisocyanate (I) is more preferably selected from IPDI and TMXDI.

Polyisocyanate (IV) is preferably selected from aromatic polyisocyanates, more preferably from those wherein the isocyanate groups are directly linked to the aromatic ring, such as MDI, PPDI and TDI. Particularly preferred is MDI or polyisocyanates comprising a high amount of such compound such as the polyisocyanates commercialized as Mondure®ML by Bayer.

The amount of polyisocyanate (I) used for the synthesis of the urethane resin is generally in the range of from 0.05 to 10 wt % of the total amount of compounds (I), (II), (III) and (IV), preferably from 0.1 to 5 wt % and more preferably from 1.5 to 5 wt %.

The amount of polyisocyanate (IV) used for the synthesis of the urethane resin is generally in the range of from 0.5 to 10 wt % of the total amount of compounds (I), (II), (III) and (IV), preferably from 2 to 8 wt % and more preferably from 3 to 6.5 wt %. Compound (II) containing at least two reactive groups capable to react with isocyanate groups is preferably a polyol. Polyols used in the preparation of the urethane resin may be high molecular weight polyols having a number average molecular weight of at least 400, or low molecular weights polyols having a molecular weight lower than 400 or any combinations or mixtures thereof. High molecular weight polyols are preferred, especially those having a number average molecular weight of at least 1000 and which does not exceed 30000, more preferably does not exceed 15000.

Examples of low molecular weight polyols are ethyleneglycol, diethyleneglycol, propyleneglycol, dipropyleneglycol, neopentyl glycol, 1,3-propane diol, 1,3-butanediol, 1,4-butanediol, 1,5-pentanediol, 1,6-hexanediol, 1,7-heptanediol, 1,8-octanediol, 2-ethyl-1,6-hexanediol, cyclohexane dimethanol, trimethylolpropane, di-trimethylol propane, glycerol, pentaerythritol and di-pentaerythritol.

Examples of high molecular weight polyols are polyester polyols, polyether polyols, polycarbonate polyols, polyacrylate polyols, polydiene polyols and hydrogenated polydiene polyols, as well as combinations thereof.

Particularly preferred are polyester polyols, polydiene polyols and hydrogenated polydiene polyols, as well as combinations thereof.

Polyols are preferably selected from polyester polyols, polybutadiene derived polyols; hydrogenated polybutadiene derived polyols; poly(ethylene/butylene) derived polyols and polyether glycols.

Preferred polyester polyols are those which are liquid at room temperature. Polyester polyols derived from dimerized fatty acids are particularly preferred. Preferred are those having a molecular weight of 500 to 20000, more preferably from 1000 to 4000, and an hydroxyl value of 5 to 160, more preferably from 30 to 65.

Preferred polybutadiene derived polyols comprise linear homopolymers produced by anionic polymerization. Examples of such polyol(s) are liquid diols of the following structure available commercially from Sartomer under the trademark Polybd® R-45HTLO.

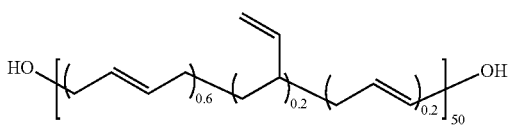

Preferred hydrogenated polybutadiene derived polyols and/or poly(ethylene/butylene) derived polyols comprise linear, saturated, and homo-telechelic polymers bearing terminal aliphatic primary hydroxyls at both ends. Examples of such polyols are liquids of the following structure available commercially from Kraton Polymers under the trade designation Kraton Liquid L-2203. Hydrogenated polybutadiene derived polyols represented by formula (II) are particularly preferred

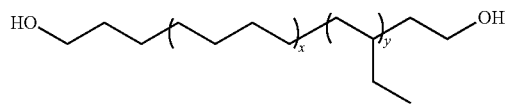

where x and y together add to from about 25 to about 60.

The total amount of compound (II) used for the synthesis of the urethane resin is usually of from 60 to 99% by weight of the total amount of compounds (I), (II), (III) and (IV) of the urethane resin, preferably of from 80 to 95% by weight.

According to a preferred embodiment of the present invention, mixtures of hydrogenated polybutadiene polyols and polyester polyols as described here above are used. The amount of polyester polyol used in the urethane resin is usually of from 25 to 97% by weight of the urethane resin, preferably of from 40 to 90% by weight.

The amount of hydrogenated polybutadiene polyol in the urethane resin is usually of from 2 to 50% by weight of the urethane resin, preferably of from 9 to 35% by weight.

By (meth)acrylate (III) containing essentially one reactive group capable to react with isocyanate groups is meant to designate in the present invention compounds comprising at least one (meth)acrylic group and one nucleophilic function capable of reacting with isocyanate, preferably an hydroxyl group. Preferred are (meth)acryloyl mono-hydroxy compounds. Acrylates are particularly preferred.

Useful (meth)acrylates (III) include the esterification products of aliphatic and aromatic polyols with (meth)acrylic acid having a residual average hydroxyl functionality of about 1. The partial esterification products of (meth)acrylic acid with tri-, tetra-, penta- or hexahydric polyols or mixtures thereof can be used. In this context, it is also possible to use reaction products of such polyols with ethylene oxide and/or propylene oxide or mixtures thereof, or reaction products of such polyols with lactones, which add to these polyols in a ring-opening reaction. Examples of suitable lactones are γ-butyrolactone and, in particular δ-valerolactone and ε-caprolactone. These modified or unmodified polyols are partly esterified with acrylic acid, methacrylic acid or mixtures thereof until the desired residual hydroxyl functionality is reached. Alternatively these products can be obtained by transesterification of the polyols with (meth)acrylic esters.

Preferred (meth)acrylates (III) are the (meth)acrylic esters with linear and branched polyols in which at least one hydroxy functionality remains free, like hydroxyalkyl(meth) acrylates having 1 to 20 carbon atoms in the alkyl group. Preferred molecules in this category are hydroxyethyl(meth) acrylate, hydroxypropyl(meth)acrylate, hydroxybutyl(meth) acrylate.

The amount of (meth)acrylate (III) used generally is from 0.01 to 20% by weight of the total amount of compounds (I), (II), (III) and (IV), preferably of from 0.05 to 10%, more preferably from 0.05 to 5% by weight.

It is preferred that the polymers of the invention are substantially free of pendant acrylate groups, i.e. that most (meth)acrylate groups are incorporated into the backbone of the main polymer chain.

The urethane(meth)acrylate resin according to the invention is obtained from the reaction, in a first step, of at least one polyisocyanate (I) with at least one compound (II) containing at least two reactive groups capable to react with isocyanate groups and at least one (meth)acrylate (III) containing essentially one reactive group capable to react with isocyanate groups, and, in a subsequent step, reacting the product obtained from the first step with at least one polyisocyanate (IV) different from the polyisocyanate (I) used in the first step.

In another aspect of the invention there is provided a process of preparing a urethane(meth)acrylate resin according to the invention comprising the reaction, in a first step, of at least one polyisocyanate (I) with at least one compound (II) containing at least two reactive groups capable to react with isocyanate groups and at least one (meth)acrylate (III) containing essentially one reactive group capable to react with isocyanate groups, and, in a subsequent step, reacting the product obtained from the first step with at least one polyisocyanate (IV) different from the polyisocyanate (I) used in the first step.

This process is preferably carried out under substantially anhydrous conditions and at a temperature between 30° C. and 150° C., more preferably between 50° C. and 130° C., until the reaction between the isocyanate groups and the isocyanate-reactive groups is substantially complete. The isocyanate content can be followed by titration with an amine.

The reactants are generally used in proportions corresponding to an equivalent ratio of isocyanate groups provided by compound (I) to isocyanate-reactive groups provided by compounds (II) and (III), of from about 0.1:1 to about 2:1, preferably from about 0.5:1 to 1.5:1.

The reaction may be facilitated by the addition of 5 to 80% by weight of a solvent in order to reduce the viscosity of the polymer resin.

According to a preferred embodiment of the process according to the invention, the reaction is carried out in the presence of at least one tackifying resin and/or at least one (meth)acrylated monomer.

The tackifying resins may be selected from the group consisting of: rosin tackifiers such as rosin acid, polymerized rosin acid, rosin esters and mixtures, and preferably hydrogenated rosin resin; hydrocarbon resin such as aliphatic and/or cycloaliphatic hydrocarbon tackifier resins, and preferably hydrogenated hydrocarbon resin; aromatic/aliphatic tackifier resins and preferably hydrogenated aromatic/aliphatic tackifier resins; polyterpene and terpene phenolic resins; aromatic resins polymerized from styrene, alpha-methyl styrene, vinyl toluene and mixtures; phenolic modified aromatic resins, benzoate resins, coumarone-indene; low molecular weight polyacrylates. Some examples of commercial tackifiers suitable for the present invention include, but are not limited to, the aliphatic and/or cycloaliphatic hydrocarbon tackifier resins available commercially from ExxonMobil under the trade marks Escorez 5300 series with soft-point from 70-150° C.; the aromatic modified aliphatic tackifier resins available commercially from ExxonMobil under the trade marks Escorez 2000 series with soft-point from 10-100° C.; the hydrogenated and/or partially hydrogenated aromatic resins available commercially from Eastman Chemicals under the trade marks Regalrez® 1018, 1085 1094, 3102, 1126, and/or PMR 1100; the polymerized aromatic resin available commercially from Eastman Chemicals under the trade marks Kristalex® 3070, 3085 and/or PM-3370; the rosin esters available commercially from Arizona Chemicals under the trade marks Sylvalite® RE 80HP (rosin ester); and Sylvares® TP7042 (high softening point (145-151° C.) thermally stable polyterpene phenol resin, TR 7115; TP2040 (thermoplastic terpene phenolic resin) and/or TR-1085 (polyterpene resin); the dicyclohexyl phthalate plasticizer and tackifier available commercially from Unitex Chemicals under the trade mark Uniplex® 280.

As used herein, (meth)acrylated monomers encompass both mono and polyfunctional (meth)acrylates as well as mixtures thereof. (Meth)acrylated monomers are preferably selected from aliphatic and aromatic alcohols which have been totally esterified with (meth)acrylic acid and contain substantially no residual hydroxyl functionality in the molecule. In this context, it is also possible to use reaction products of such alcohols with ethylene oxide and/or propylene oxide or mixtures thereof, or reaction products of such polyols with lactones, which add to these polyols in a ring-opening reaction. Examples of suitable lactones are γ-butyrolactone and, in particular δ-valerolactone and ε-caprolactone. These modified or unmodified alcohols are preferably totally esterified with acrylic acid, methacrylic acid or mixtures thereof until substantially no residual hydroxyl functionality remains. Examples of poly-unsaturated compounds from this category are trimethylolpropane tri-acrylate, glycerol tri-acrylate, pentaerythritol tetra-acrylate, di-trimethylolpropane tetra-acrylate, di-pentaerythritol hexa-acrylate and their (poly)ethoxylated and/or (poly)propoxylated equivalents, as well as mixtures thereof. Preferred are (meth)acrylated monomers are mono, di and trifunctional (meth)acrylates such as beta-carboxyethyl(meth)acrylate, methyl(meth)acrylate, ethyl(meth)acrylate, propyl(meth)acraylte, butyl(meth)acrylate, pentyl(meth)acrylate, hexyl(meth)acrylate, cyclohexyl(meth)acrylate, phenoxyethyl(meth)acrylate, 2-ethyl hexyl(meth)acrylate, isobornyl(meth)acrylate, hexanediol di(meth)acrylate, octylacrylate, polyethylene glycol di(meth)acrylate, especially the polyethylene glycol diacrylate commercialized as EBECRYL®11, ethoxylated and propoxylated glycerol tri(meth)acrylate, especially those commercialized as EBECRYL®12 and EBECRYL®53.

During this preparation process, it is common to use catalysts to accelerate the reaction of the isocyanates towards hydroxyls and to use inhibitors in order to prevent the radical reaction of the reactive unsaturations. It is possible in the frame of this invention to use a sequential process during which compound (I) and/or compounds (II) and (III) are added incrementally in two or several portions, or with a continuous feed.

The compounds (II) and (III) are preferably used in a molar ratio (II):(III) of 0.25:1 to 200:1, more preferably from 3:1 to 50:1.

The reaction in the first step is preferably conducted until at least 80%, preferably at least 90% of the polyisocyanate (I) is reacted. The reaction product obtained after the first step is further reacted with isocyanate compound (IV), preferably until the total residual isocyanate content is lower than 0.5 wt %, preferably lower than 0.2 wt %.

The urethane(meth)acrylate resin according to the invention generally has a an amount of (meth)acryl groups of at least $9 \times 10^4$ meq/g of urethane(meth)acrylate resin. The amount of (meth)acryl groups can be measured by a titration method in which the unsaturated product is reacted with bromine by addition of an excess of bromate-bromide solution to an acidified solution of the sample. After a suitable reaction time, potassium iodide is reacted with the bromine access to form iodine. Iodine is then titrated with sodium thiosulfate allowing calculation of the amount of unsaturated groups.

Preferably the amount of (meth)acrylate groups of the urethane(meth)acrylate resin does not exceed 0.5 meq/g, especially not 0.1 meq/g.

The urethane(meth)acrylate resin preferably has a number average molecular weight of at least 670 Dalton, more preferably of at least 10,000 Dalton. Generally the urethane (meth)acrylate resins has a number average molecular weight not exceeding 200,000 Dalton, preferably not exceeding 100,000 Dalton.

The urethane(meth)acrylate resin preferably has a glass transition temperature $T_G$ from −60 to +100° C., as measured by Differential Scanning calorimetry according to ASTM D3418 with a heating gradient of 20° C. per minute.

The urethane(meth)acrylate resin according to the invention generally comprises a block copolymer comprising a block of urethane provided by reaction of the first polyisocyanate (I) with compound (II) and a block of urethane provided by the reaction of the second polyisocyanate (IV) with compound (II).

Therefore broadly in accordance with the present invention there are provided urethane (meth)acrylate resins comprising polymers of Formula (I):

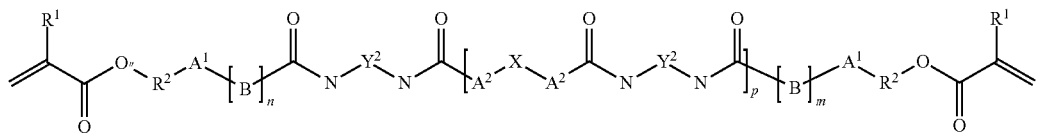

wherein
each $A^1$ and each $A^2$, independently, represent O, NH or S, preferably O each $R^1$, independently, represents H or an alkyl group containing from 1 to 4 carbon atoms, preferably H each $R^2$, independently, represents an alkyl group containing from 1 to 18 carbon atoms, preferably from 2 to 4 carbon atoms B represents

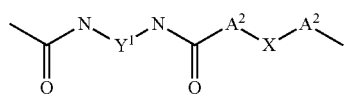

$Y^1$ represents the residue from polyisocyanate (I)
$Y^2$ represents the residue from polyisocyanate (IV)
X represents the residue of the compound (II)
n and m are each independently, is an integer from 1 to 100,
p is an integer from 0 to 100.

The urethane(meth)acrylate resin according to the invention is particularly suitable for making adhesives, especially pressure sensitive adhesives.

The urethane(meth)acrylate resin according to the invention is radiation-curable. As used herein 'radiation-curable' denotes a material which will polymerize when irradiated for example with actinic radiation, such as ultraviolet (UV) light and visible light (optionally in the presence of another ingredient such as a photo-initiator) and/or ionizing radiation (such as electron-beam). Actinic radiation is electromagnetic radiation capable of producing photochemical action, but of insufficient energy to product ions in a medium of common materials and usually has a wavelength of greater than 185 nanometres. UV light is radiant energy having a wavelength from 180 to 400 nanometres. Visible light is radiant energy having a wavelength from 400 to 800 nanomerters. Ionizing radiation is particle or electromagnetic energy capable of producing ions in common materials; usually energies of greater than about 10 electron volts or 16×10–19 joules. Electron beam is a beam of electrons typically displaced from a metallic filament by a high voltage source of acceleration. Preferred methods to achieve radiation polymerization comprise UV light and/or e-beam, more preferably UV light. The polymerization mechanism can be any suitable method that can be induced by radiation (e.g. free radical, cationic etc).

Another aspect of the present invention provides an adhesive curable by radiation, the adhesive comprising one or more urethane(meth)acrylate resins according to the invention, optionally together with a photo-initiator.

A further aspect of the present invention provides a radiation curable adhesive composition comprising from 5 to 95%, usually from 10 to 90% by weight, preferably from 20 to 70%, of one or more urethane (math)acrylate(s) of the invention together with from 5 to 95% by weight, usually from 10 to 90% by weight, preferably from 30 to about 80%, of one or more tackifier(s), and, optionally from 1 to 80%, preferably from 1 to 50%, by weight of one or more monomers, preferably (meth)acrylated monomers.

Tackifiers such as described here above may be used. The tackifier may be added to the urethane(meth)acrylate resin according to any possible method.

According to a preferred embodiment of the present invention the tackifier is added to the urethane(meth)acrylate resin during its synthesis.

Suitable monomers include the (meth)acrylated monomers such as described here above as well as (meth)acrylated alkylphosphate esters, especially those according to formula (I)

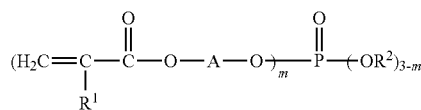

wherein each $R^1$ is independently hydrogen or an alkyl group having from 1 to 8 carbon atoms, more preferably hydrogen or methyl; each $R^2$ is independently selected from the group consisting of hydrogen, an alkyl group having from 1 to 8 carbon atoms, and a haloalkyl group having from 1 to 8 carbon atoms, more preferably hydrogen; each A is independently an alkylene group containing from 1 to 9 carbon atoms, optionally containing 1 to 3 ether and/or —OC(O)— bridges, more preferably an alkylene comprising 2 to 6 carbon atoms, most preferably an ethylene; and m is 1 to 3. Particularly preferred are the reaction products of $P_2O_5$ with hydroxy group containing (meth)acrylates, especially with 2-hydroxyethyl(meth)acrylate. Preferred are the (meth)acrylates commercialized as EBECRYL®168, EBECRYL®170 and EBECRYL®171. Other suitable monomers include maleate esters, such as di-octylmaleate and di-isotridecylmaleate.

According to a preferred embodiment of the present invention part of the monomer(s) are added during the synthesis of the urethane(meth)acrylate resin and part of the monomer(s) are added just after the synthesis of the (meth)acrylate resin. The radiation curable adhesive composition may further comprise usual additives such as stabilizers, radical inhibitors and scavengers and anti-oxidants.

The radiation curable adhesive can be cured by electron beam without the necessity to add one or more photoinitiatiors. The radiation curable adhesive composition preferably comprises from about 0.01% to 7%, more preferably to 5% by weight of one or more photo initiator.

The components of the adhesives of the invention may be mixed and adhesive coatings prepared and applied to suitable substrates by any suitable means such as those well known to those skilled in the art.

The urethane(meth)acrylate resin and the compositions containing them according to the present invention present several advantages, including flexibility, elastic property, good wetting and flowing properties, hydrogen bonding to produce exceptional adhesion, good heat resistance, excellent weathering properties, and toughness. The different softness/hardness segments of the urethane designs can form a different phase structures which can governs and alternates the adhesion performance properties including good adhesion and cohesion performance at both high and low temperatures when the film has been already applied to the substrates, excellent adhesion for both low and high surface energy substrates, excellent balance between adhesion and cohesive strength. The present invention resin can also be made into thick film and still exhibit the excellent film properties including through cure with thick film and broad curing window.

The urethane(meth)acrylate resin and the compositions containing them according to the present invention generally acquire pressure sensitive adhesive characteristics upon exposure to a radiant energy source such as actinic radiation and/or ultraviolet (UV) light (optionally in the presence of another ingredient such as a photo-initiator) and/or ionizing radiation (such as electron-beam). The present invention therefore further relates to a method of preparing a radiation cured adhesive composition comprising the steps of : (a) providing a radiation curable composition comprising a urethane(meth)acrylate resin according to the present invention, (b) applying said composition to a substrate, and (c) exposing said composition to a radiant energy source to cure the said composition to a pressure sensitive adhesive. The present invention further relates to a pressure sensitive adhesive obtained from the urethane(meth)acrylate resin according to the invention. The substrate can be any substrate such as paper, film or foil.

The present invention will now be described in detail with reference to the following non limiting examples which are by way of illustration only. Except when otherwise indicated, the parts mentioned in the examples are parts by weight.

BHT is 2,6-di-t-butyl-4-methylphenol, a radical scavenger; beta-CEA is beta-carboxyethyl acrylate; DBTDL is dibutyl tin dilaurate; EHA is 2-ethyl hexyl acrylate; ESCOREZ®2520 and 5380 are petroleum hydrocarbon resin tackifiers available commercially from Exxon Mobil under these trade names; HDODA is 1,6-hexanediol diacrylate; HEA is 2-hydroxyethyl acrylate; IPDI is isophorone diisocyanate; IRGACURE®184 is hydroxycyclohexyl-phenyl-ketone, a photoinitiator available commercially from Ciba under this trade name; IRGANOX® 1010 is tetrakis[methylene(3,5-di-(tert)butyl-4-hydroxyhydrocinnamate)]methane, an anti-oxidant available commercially from Ciba under this trade mark; KRASOL®HLBH P3000 is a hydrogenated hydroxyl terminated linear poly(butadiene) that is available commercially from Sartomer under this trade name; MEHQ is 4-methoxyphenol, a radical inhibitor; and PRIPLAST®3196 is a polyester polyol liquid of molecular weight 3000, hydroxyl value 34-40, that is available commercially from Croda under this trade name.

EXAMPLE 1

In a reaction kettle with mixer and delay system, 9.63 g of tackifier ESCOREZ®2520 was heated at 60° C. before addition of 11.6 g of hydroxyl terminated hydrogenated polybutadiene KRASOL®HLBH P3000 and 19.2 g of polyester polyol PRILAST®3196, both preheated at 60° C., and the reactor was heated to 90° C. 402 g of tackifier ESCOREZ®5380 was added to reactor whilst the contents were still being mixed at a rate which does not cause the reaction mixture to stick to the mixer. The reactor was then heated to 110° C. and after which 0.05 g BHT, 0.02 g of MEHQ, 0.09 g of HEA and 0.14 g of DBTBL are added to the reactor. Dry air was added to the reactor and the temperature was cooled to 105° C. whilst the contents were mixed for 15 to 30 minutes.

A mixture of 1.13 g IPDI and 0.19 g HDODA was charged to the reactor slowly over 30 min at 110° C. The reactor was cooled to prevent overheating so that the reaction temperature did not exceed 120° C.

The reactor contents were held at 110° C. for a further two hours and 30 minutes after addition of the IPDI mix was complete until at least 90% of IPDI had reacted as determined by titration of residual IPDI in the solution.

Then 1.27 g of MDI was added with 0.19 g of HDODA. The reaction was held for another two hours and then 6.93 g of EHA was added to reduce the viscosity of the polymer. The polymer was held at the same temperature and stirred until the isocyanate content was less than 0.2%.

The polymer was further formulated by adding 2 g of IRGACURE®184, 0.3 g of IRGANOX®1010, 0.02 MEHQ, 0.02 BHT and 2 g of IBOA. 1 g beta-CEA was added to the reactor under a slightly reduced pressure. The reaction mixture was mixed for a further 30 to 45 minutes. The final product was a fully formulated UV curable, warm melt, PSA with a viscosity of 125-200 mPa·s at 90° C.

COMPARATIVE EXAMPLE 1R

Example 1 was repeated except that 2.3 g of IPDI were used in the first step and the second step comprising the addition of MDI was omitted. The reaction was conducted until the residual isocyanate content was less than 0.2 wt. %.

COMPARATIVE EXAMPLE 2R

Example 1 was repeated except that 2.6 g of MDI were used in stead of IPDI in the first step of the reaction and that the second step was omitted. The reaction was conducted until the residual isocyanate content was less than 0.2 wt. %

COMPARATIVE EXAMPLE 3R

Example 1 was repeated except that a mixture of 1.13 g of IPDI and 1.27 g of MDI was used in the first step of the reaction and that the second step was omitted. The urethane reaction was carried for 4 hours until the residual isocyanate group was less than 0.2 wt %.

EXAMPLE 2

Example 1 was repeated except that after the IPDI reaction, the monomers including EHA, beta-CEA, IBOA and HDODA were added first to dilute the reaction mixture before MDI addition. The reaction was conducted until the residual isocyanate content was less than 0.2 wt. %.

EXAMPLE 3

In a reaction kettle with mixer and delay system, 49.83 g of toluene was heated at 60° C. before addition of 15 g of hydroxyl terminated hydrogenated polybutadiene KRASOL®HLBH P3000 and 15 g of polyester polyol PRILAST®3196, both preheated at 60° C., and the reactor was heated to 90° C. The reactor was then heated to 110° C. and after which 0.02 g BHT, 0.02 g of MEHQ, 0.11 g of HEA and 0.10 g of DBTBL were added to the reactor. Dry air was added to the reactor and the temperature was cooled to 105° C. whilst the contents were mixed for 15 to 30 minutes.

1.23 g IPDI and 0.19 g HDODA was charged to the reactor slowly over 30 min at 110° C., under cooling in order to maintain the reaction temperature under 115° C.

The reactor contents were held at 110° C. for a further three hours after addition of the IPDI mix was complete; then 1.36 g of MDI was added and the reaction was remained for another 2 hours. Then 6.93 g of EHA and 7 g of HDODA was added to reduce the viscosity of the polymer. The polymer was held at the same temperature and stirred until the isocyanate content was less than 0.2%.

The polymer was further formulated by adding 9.63 g of tackifier (ESCOREZ®2520), 40.2 g of tackifier (ESCOREZ®5380), 2 g of IRGACURE®184, 0.3 g of IRGANOX®1010, 0.02 MEHQ, 0.02 BHT, and 1 g beta-CEA to the reactor under a slightly reduced pressure. The reaction mixture is mixed for a further 30 to 45 minutes. The final product is a fully formulated UV curable, solventborne UV-PSA with total solids around 66.8%.

EXAMPLE 4

In a reaction kettle with mixer and delay system, 10.1 g of tackifier (ESCOREZ®2520) was heated at 60° C. before addition of 12.2 g of hydroxyl terminated hydrogenated polybutadiene KRASOL®HLBH P3000 and 20.2 g of polyester polyol PRILAST®3196, both preheated at 60° C., and the reactor was heated to 90° C. 422 g of tackifier (ESCOREZ®5380) was added to reactor whilst the contents were still being mixed at a rate which does not cause the reaction mixture to stick to the mixer. The reactor was then heated to 110° C. and after which 0.05 g BHT, 0.02 g of MEHQ, 0.09 g of HEA and 0.13 g of DBTBL are added to the reactor. Dry air was added to the reactor and the temperature was cooled to 105° C. whilst the contents were mixed for 15 to 30 minutes.

A mixture of 0.605 g IPDI and 0.19 g HDODA was charged to the reactor slowly over 30 min at 110° C. The reactor contents were held at 110° C. for a further two hours and 30 minutes after addition of the IPDI mix was complete. Then 2.04 g of MDI was added with 0.19 g of HDODA. The reaction is held for another two hours and then 6.93 g of EHA was added to reduce the viscosity of the polymer. The polymer was held at the same temperature and stirred until the isocyanate content was less than 0.2%.

The polymer was further formulated by adding 1 g of IRGACURE®184, 0.3 g of IRGANOX®1010, 0.02 MEHQ, 0.02 BHT and 1 g beta-CEA to the reactor under a slightly reduced pressure. The reaction mixture is mixed for a further 30 to 45 minutes.

EXAMPLE 5

In a reaction kettle with mixer and delay system, 15.1 g of tackifier (ESCOREZ®2520) was heated at 60° C. before addition of 12.2 g of hydroxyl terminated hydrogenated polybutadiene KRASOL®HLBH P3000 and 20.2 g of polyester polyol PRILAST®3196, both preheated at 60° C., and the reactor was heated to 90° C. 372 g of tackifier (ESCOREZ® 5380) was added to reactor whilst the contents were still being mixed at a rate which does not cause the reaction mixture to stick to the mixer. The reactor was then heated to 110° C. and after which 0.05 g BHT, 0.02 g of MEHQ, 0.09 g of HEA and 0.13 g of DBTBL are added to the reactor (in that order) Dry air was added to the reactor and the temperature was cooled to 105° C. whilst the contents were mixed for 15 to 30 minutes.

A mixture of 1.21 g IPDI and 0.19 g HDODA was charged to the reactor slowly over 30 min at 110° C. The reactor contents were held at 110° C. for a further two hours and 30 minutes after addition of the IPDI mix was complete. Then 2.04 g of MDI was added with 0.19 g of HDODA. The reaction is held for another two hours and then 6.93 g of EHA was added to reduce the viscosity of the polymer. The polymer was held at the same temperature and stirred until the isocyanate content was less than 0.2%.

The polymer was further formulated by adding 1 g of IRGACURE® 184, 0.3 g of IRGANOX® 1010, 0.02 MEHQ (second amount), 0.02 BHT (second amount), and 1 g beta-CEA is added to the reactor under a slightly reduced pressure. The reaction mixture is mixed for a further 30 to 45 minutes.

EXAMPLE 6

In a reaction kettle with mixer and delay system, 10.1 g of tackifier (ESCOREZ®2520) was heated at 60° C. before addition of 16.9 g of hydroxyl terminated hydrogenated polybutadiene KRASOL® HLBH P3000 and 10.3 g of polyester polyol PRILAST® 3196, both preheated at 60° C., and the reactor was heated to 90° C. 46.2 g of tackifier (ESCOREZ®5380) was added to reactor whilst the contents were still being mixed at a rate which does not cause the reaction mixture to stick to the mixer. The reactor was then heated to 110° C. and after which 0.05 g BHT, 0.02 g of MEHQ, 0.09 g of HEA and 0.13 g of DBTBL are added to the reactor (in that order) Dry air was added to the reactor and the temperature was cooled to 105° C. whilst the contents were mixed for 15 to 30 minutes.

A mixture of 1.21 g IPDI and 0.19 g HDODA was charged to the reactor slowly over 30 min at 110° C. The reactor contents were held at 110° C. for a further two hours and 30 minutes after addition of the IPDI mix was complete. Then 1.36 g of MDI was added with 0.19 g of HDODA. The reaction is held for another two hours and then 6.93 g of EHA was added to reduce the viscosity of the polymer. The polymer was held at the same temperature and stirred until the isocyanate content was less than 0.2%.

The polymer was further formulated by adding 2 g of IRGACURE®184, 0.3 g of IRGANOX®1010, 0.02 MEHQ, 0.02 BHT, 2 g IBOA and 1 g beta-CEA to the reactor under a slightly reduced pressure. The reaction mixture is mixed for a further 30 to 45 minutes.

EXAMPLES 7 TO 14

Example 1 was reproduced except that the following changes were made:
- in Example 7, 1.81 g of TMXDI was used in the first step in stead of 1.13 g of IPDI. The reaction was conducted until the residual isocyanate content was less than 0.2 wt %.
- in Example 8, a mixture of 24.27 g of tackifier ESCOREZ®2520 and 24.27 g of tackifier ESCOREZ®5380 was used.
- in Example 9, a mixture of IRGACURE®651 and IRGACURE®500 was used in stead of IRGACURE®184.
- in Example 10, an octyl- and decyl acrylate mixture was used in stead of EHA
- in Examples 11 to 13, beta-CEA was replaced by, respectively phosphate esters EBECRYL®170, EBECRYL®168 and PAM-300.
- in Example 14, commercially available surfactant di-octyl maleate EROSOL®OT-35 was added to the mixture.

The products obtained from examples 1 and 3 to 6 and comparative examples 1R to 3R where then evaluated as follows:

The products were preheated in the reservoir of a hotmelt coater up to 110° C. and a film of the adhesive was coated to a release liner (LAROPEX RP 12) directly by pulling the substrate out in a steady state. The film thickness was controlled by adjusting the gap between the two coating bars. Films of 2 mils and 5 mils were prepared. The coated adhesive films were then cured by submitting them to UV radiation using a UV curing system (Fusion DRS 120 NQ equipped with a H-bulb) at UV radiation dosages of UVC from 20 to 250 mJ/cm$^2$. The cured film is then laminated with either another release liner LAROPEX RP 12 or a Mylar film (PET) or aluminum film (Al) depending on the further test requirement.

Before preparing the film from the product obtained from Example 3, the solvent contained therein was first stripped by distillation.

The cured films were then submitted to the tests listed here below, which are further described in Test Methods for Pressure-Sensitive Tapes, 13th Edition, August 2001, Pressure-Sensitive Tape Council, Glenview, Ill., which is incorporated by reference herein.

Peel Adhesion: Peel adhesion is the force required to remove a coated flexible sheet material from a test panel measured at a specific angle and rate of removal. In the tables here below this force is expressed in pound per inch (1b/in) width of coated sheet. The cured 2-mil thick films laminated with MYLAR as prepared here above were applied to a silicone release paper. Specimens of 1" by 8" were cut from the coated Mylar film. After conditioning 24 hours at 74° F. and 50% relative humidity, the release paper was removed and specimens were bonded to the horizontal surface of a clean substrate (being either stainless steel test plate, polypropylene, HDPE, ABS or aluminum as specified in the Tables here below). The bonds were then rolled using an auto roller. After conditioning the bonds for a specific dwell time, the bonds were peeled at 180° or 90° angle in a peel tester at a constant peeling rate of 12"/minute. The results are reported in Tables 1 to 5, as an average load in lb/in.

Shear Resistance (PSTC-107): The shear resistance is a measure of the cohesiveness or internal strength of an adhesive. It is based upon the amount of force required to pull an adhesive strip from a standard flat surface in a direction parallel to the surface to which it has been affixed with a definite pressure. It is measured in terms of time required to pull a standard area of adhesive coated sheet material from a stainless steel test panel under a constant load. The tests were conducted on cured film strips applied to a stainless steel panel with certain size of the strip such that a 1" by 1" portion of each strip was in firm contact with the panel with one end portion of the tape being free. The panel with coated strip attached was held in a rack so that the panel forms an angle of 178°. After conditioning the bonds for 24 hours at constant room temperature (22.0±1° C.) and humidity (50%±5%), a certain constant weight such as 2 kg was hanged on the extended tape free end. The hanging time (in hours) as presented in Tables 1 to 3 and 5 (as room temperature Shear, RT Shear) is recorded ones the sample strip is falling off from the stainless steel panel. In some cases the test was stopped before the sample strip fell off—in that case the time at which the test was stopped is presented in the tables as >number).

93C Shear Test: The 93C shear resistance test is a measure of both adhesion of the hot adhesive to the hot substrate as well as the cohesiveness of the hot adhesive. The adhesive films was prepared in such a way so it has an area of 1" by 1" firmly contacted with the stainless steel substrate and a free end can be hanged by a constant coat weight. The test involves 24 hours room temperature conditioning followed by 1 hour at 93° C. conditioning before 1 Kg weight was hanged on the extended tape free end. The panel with coated strip attached was held in a rack so that the panel forms an angle of 178°.

The hanging time (in minutes) as presented in Tables 1 and 3 (as 93C Shear) is recorded ones the sample strip is falling off from the stainless steel panel.

Through cure: According to the Beer's law, the light transmittance is proportional reduced when the film thickness is increased which could cause a problem of through cure for the UV curable PSA film. When a film thickness is increased, the bottom of the film close to the substrate will get less UV energy to crosslink the film which will drive the film performance difference between the top and the bottom part. The robustness of the through cure performance of the UV PSA has been evaluated by testing both sides of the films cured in one direction with the same test methods mentioned above. For this test the cured films were first laminated with a second release liner (LAROPEX RP 12) and thereafter the first release liner was removed and replaced with the substrate. The results are presented in Table 4.

TABLE 1

|  | Example 1 | Comp. Ex. 1R | Comp. Ex. 2R | Comp. Ex. 3R |
|---|---|---|---|---|
| 30 min peel stainless steel 180°(lb/in) | 4.35 | 4.07 | 1.39 | NA |
| RT shear (h) | >168 | 107 | >336 | NA |
| 93 C. shear (min) | >3000 | 9 | 151 | <9 |

The results presented in Table 1 show the unexpected better performances of the urethane acrylate resin according to the invention over very similar urethane acrylates.

TABLE 2

|  | Example 3 | Example 4 | Example 5 | Example 6 |
|---|---|---|---|---|
| 30 min peel 180°(lb/in) | 6 | 2.5 | 5 | 6 |
| RT shear (h) | >100 | >400 | >80 | >168 |

Table 2 shows that polymers made with various compositions similar to Example 1 also offer excellent balance on adhesion and cohesion performance as pressure sensitive adhesives.

Table 3 shows the adhesive properties of 2 and 5 mil cured films obtained from the product of Example 1 on different substrates.

TABLE 3

| Substrate | units | 2 mil film | 5 mil film |
|---|---|---|---|
| Stainless Steel |  |  |  |
| 15 min 90° RT peel (Al) | lb/in | 4.06 | 4.96 |
| 72 hr 90° RT peel (Al) | lb/in | 4.72 | 5.295 |
| RT Shear (PET) | hours | 400 | >280 |
| 93 C. Shear (PET) | minutes | >10000 | 178.75 |
| Polypropylene |  |  |  |
| 15 min 90° RT peel (Al) | lb/in | 2.42 | 2.84 |
| 72 hr 90° RT peel (Al) | lb/in | 5.24 | 3.83 |
| High Density Polyethylene |  |  |  |
| 15 min 90° RT peel (Al) | lb/in | 1.63 | 2.53 |
| 72 hr 90° RT peel (Al) | lb/in | 1.76 | 2.71 |

TABLE 3-continued

| Substrate | units | 2 mil film | 5 mil film |
|---|---|---|---|
| ABS | | | |
| 15 min 90° RT peel (Al) | lb/in | 3.76 | 4.36 |
| 72 hr 90° RT peel (Al) | lb/in | 4.29 | 5.28 |

Table 4 shows the through cure performances of 2 and 5 mil cured films obtained from the product of Example 1 on different substrates.

TABLE 4

| Substrate | units | 2 mil film | 5 mil film |
|---|---|---|---|
| Stainless Steel | | | |
| 15 min 90° RT peel Side A (Al) | lb/in | 4.06 | 4.96 |
| 15 min 90° RT peel Side B (Al) | lb/in | 3.89 | 4.82 |
| 72 hr 90° RT peel Side A (Al) | lb/in | 4.72 | 5.295 |
| 72 hr 90° RT peel Side B (Al) | lb/in | 4.3 | 5.055 |
| Polypropylene | | | |
| 15 min 90° RT peel Side A (Al) | lb/in | 2.42 | 2.84 |
| 15 min 90° RT peel Side B (Al) | lb/in | 3.35 | 4.35 |
| 72 hr 90° RT peel Side A (Al) | lb/in | 5.24 | 3.83 |
| 72 hr 90° RT peel Side B (Al) | lb/in | 3.82 | 5.62 |
| High Density Polyethylene | | | |
| 15 min 90° RT peel Side A (Al) | lb/in | 1.63 | 2.53 |
| 15 min 90° RT peel Side B (Al) | lb/in | 2.26 | 2.85 |
| 72 hr 90° RT peel Side A (Al) | lb/in | 1.76 | 2.71 |
| 72 hr 90° RT peel Side B (Al) | lb/in | 2.23 | 2.9 |
| ABS | | | |
| 15 min 90° RT peel Side A (Al) | lb/in | 3.76 | 4.36 |
| 15 min 90° RT peel Side B (Al) | lb/in | 3.89 | 4.41 |
| 72 hr 90° RT peel Side A (Al) | lb/in | 4.29 | 5.28 |
| 72 hr 90° RT peel Side B (Al) | lb/in | 3.83 | 5.79 |

Table 5 shows the impact of the UV exposure on the performances of the product obtained from Example 1.

TABLE 5

| | | 2 mil film | | | 5 mil film | | |
|---|---|---|---|---|---|---|---|
| UVC Exposure | mJ/cm$^2$ | 19.0 | 63.0 | 133.0 | 77.0 | 133.0 | 412.0 |
| 15 min 90° RT peel (Al) | lb/in | 4.1 | 4.1 | 4.1 | 5.0 | 4.9 | 4.8 |
| 72 hr 90° RT peel (Al) | lb/in | 4.7 | 4.8 | 3.9 | 5.3 | 5.1 | 5.4 |
| RT Shear (PET) 2 kg/in$^2$ | hours | 400 | >400 | 324.3 | >280 | 120.9 | >239 |

Table 6 shows the performance of the pressure sensitive adhesives made from examples 8 and 10.

TABLE 6

| | Example 8 | Example 10 |
|---|---|---|
| Loop Tack (average lb/in) | 5.23 | 4.00 |
| 93 C. shear (min) | >1000 | >1000 |
| RT shear (h) | 55 | >100 |
| 30 min peel stainless steel 180°(lb/in) | 3.63 | 4.20 |
| 30 min peel polypropylene 180°(lb/in) | 5.13 | 5.30 |

The properties of the pressure sensitive adhesives obtained with the rest of the examples are similar to those obtained with the product of Example 1.

The invention claimed is:

1. A urethane (meth)acrylate resin obtained from a reaction, comprising:
   in a first step, reacting at least one polyisocyanate (I) with at least one compound (II) containing at least two reactive groups capable of reacting with isocyanate groups and at least one (meth)acrylate (III) comprising one reactive group capable of reacting with an isocyanate group to obtain a product, and,
   in a second subsequent step, reacting the product obtained from the first step with at least one polyisocyanate (IV) different from the polyisocyanate (I) reacted in the first step; said compound (II) is used in a total amount of from 60 to 99% by weight of the total amount of compounds (I), (II), (III) and (IV) of the urethane resin.

2. The urethane (meth)acrylate resin according to claim 1, wherein the at least one polyisocyanate (I) is selected from the group consisting of an aliphatic polyisocyanate, a cycloaliphatic polyisocyanate and a benzylic polyisocyanate, and wherein the polyisocyanate (IV) is an aromatic polyisocyanate.

3. The urethane (meth)acrylate resin according to claim 2, wherein the at least one polyisocyanate (I) is 5-isocyanato-1-isocyanatomethyl-1,3,3-trimethylcyclohexane and/or tetramethylxylilene diisocyanate, and wherein the polyisocyanate (IV) is 1,1'-methylenebis[4-isocyanatobenzene].

4. The urethane (meth)acrylate resin according to claim 1, wherein the at least one compound (II) is selected from the group consisting of polyester polyols, polybutadiene derived polyols, hydrogenated polybutadiene derived polyols, poly (ethylene/butylene) derived polyols and polyether glycols.

5. The urethane (meth)acrylate resin according to claim 4, wherein the at least one compound (II) comprises a mixture of at least one polyester polyol and at least one hydrogenated polybutadiene derived polyol.

6. The urethane (meth)acrylate resin according to claim 4, wherein the at least one polyester polyol has a molecular weight of 500 to 20,000 and hydroxyl value of 30 to 65.

7. The urethane (meth)acrylate resin according to claim 4, wherein the at least one hydrogenated polybutadiene derived polyol is represented by formula (II)

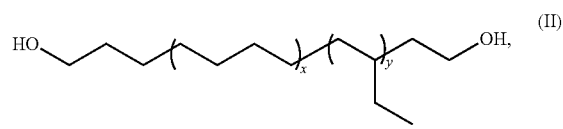

wherein x and y together add to from about 25 to about 60.

8. The urethane (meth)acrylate resin according to claim 1, wherein the at least one (meth)acrylate (III) is a hydroxyalkyl (meth)acrylate having 1 to 20 carbon atoms in the alkyl group.

9. The urethane (meth)acrylate resin according to claim 1, comprising polymers of formula (I):

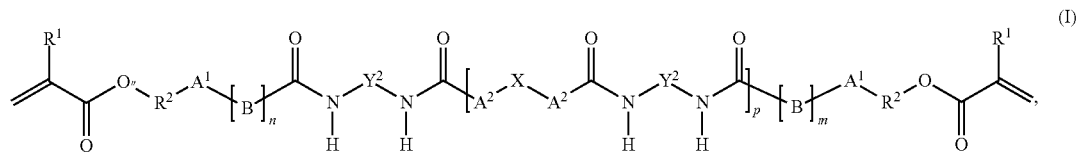

wherein:
each $A^1$ and each $A^2$, independently, represent O, NH or S,
each $R^1$, independently, represents H or an alkyl group containing from 1 to 4 carbon atoms,
each $R^2$, independently, represents an alkyl group containing from 1 to 18 carbon atoms,

represents

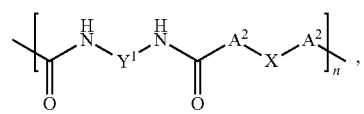

wherein
$Y^1$ represents the residue from the polyisocyanate
each $A^2$ is as defined above,
X represents the residue from the compound (II), and
n is an integer from 1 to 100,

represents

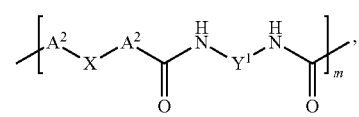

wherein
$Y^1$ is as defined above,
each $A^2$ is as defined above, and
m is an integer from 1 to 100,
$Y^2$ represents the residue from the polyisocyanate (IV), and
p is an integer from 0 to 100.

10. The urethane (meth)acrylate resin according to claim 1, obtained from the reaction, wherein
in the first step, from 0.05 to 10 wt % of at least one polyisocyanate (I) is reacted with from 60 to 99 wt % of at least one compound (II) containing at least two reactive groups capable of reacting with isocyanate groups and from 0.01 to 20 wt % of at least one (meth)acrylate (III) comprising one reactive group capable of reacting with an isocyanate group to obtain the product, and,
in the second subsequent step, the product obtained from the first step is reacted with from 0.5 to 10 wt % of at least one polyisocyanate (IV) different from the polyisocyanate (I) reacted in the first step.

11. A pressure sensitive adhesive obtained from curing the urethane (meth)acrylate resin according to claim 1.

12. The urethane (meth)acrylate resin according to claim 5, wherein the at least one polyester polyol has a molecular weight of 500 to 20,000 and a hydroxyl value of 30 to 65.

13. The urethane (meth)acrylate resin according to claim 5, wherein the hydrogenated polybutadiene derived polyol is represented by formula (II)

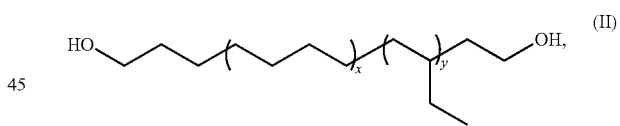

wherein x and y together add to from about 25 to about 60.

* * * * *

UNITED STATES PATENT AND TRADEMARK OFFICE
CERTIFICATE OF CORRECTION

PATENT NO.        : 8,669,301 B2                                             Page 1 of 1
APPLICATION NO.   : 13/119525
DATED             : March 11, 2014
INVENTOR(S)       : Zhao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 142 days.

Signed and Sealed this
Twenty-ninth Day of September, 2015

Michelle K. Lee
*Director of the United States Patent and Trademark Office*